United States Patent [19]

Kiyono et al.

[11] Patent Number: 5,020,724
[45] Date of Patent: Jun. 4, 1991

[54] NOZZLE FOR WATER JET CUTTING

[75] Inventors: Fumio Kiyono; Takayuki Saito; Keiji Handa, all of Tsukuba, Japan

[73] Assignee: Agency of Industrial Science and Technology, Ministry of International Trade & Industry, Tokyo, Japan

[21] Appl. No.: 428,938

[22] Filed: Oct. 30, 1989

[30] Foreign Application Priority Data

Nov. 22, 1988 [JP] Japan .................................. 63-295513

[51] Int. Cl.$^5$ .............................................. B05B 1/08
[52] U.S. Cl. ............................ 239/102.2; 175/67/424
[58] Field of Search ......................... 239/102.1, 102.2; 175/67, 424; 299/17; 166/222, 223

[56] References Cited

U.S. PATENT DOCUMENTS

| 2,834,158 | 5/1958 | Petermann | 239/102.2 X |
| 3,433,461 | 3/1969 | Scarpa | 239/102.2 X |
| 4,277,025 | 7/1981 | Harvey | 239/102.2 |
| 4,474,251 | 10/1984 | Johnson, Jr. | 239/102.2 X |
| 4,912,357 | 3/1990 | Drews et al. | 239/102.2 X |

Primary Examiner—Andres Kashnikow
Assistant Examiner—William Grant
Attorney, Agent, or Firm—Oblon, Spivak, McClelland, Maier & Neustadt

[57] ABSTRACT

A nozzle for water jet cutting has a piezoelectric element provided at a position for acting on a fluid in its pressure chamber. A voltage varying with time is applied to the piezoelectric element to provide flow rate oscillation or pressure pulsation to the fluid which is jetted from the nozzle.

3 Claims, 4 Drawing Sheets

NOZZLE FOR WATER JET CUTTING

BACKGROUND OF THE INVENTION

1. Field of the Invention

This invention relates to a nozzle for water jet cutting, which is used for cutting or processing various materials utilizing the energy of a fluid jetted from it at a high speed. More particularly, the invention concerns a water jet cutting nozzle having a mechanism for providing flow rate oscillation or pressure pulsation to the jetted fluid.

2. Prior Art Statement

Nozzles for water jet cutting are used for cutting, digging or processing various materials utilizing the energy of a fluid jetted at high speeds. This operation is based on a well-known cutting mechanism, in which the flow rate oscillation or pressure pulsation of a fluid striking an object causes repeated fatigue destruction of the object and the destroyed portion of the object is carried away by the stream of fluid. The cutting proceeds in this way.

The cutting speed thus can be increased by increasing the flow rate oscillation or pressure pulsation of the fluid striking the object.

A prior art water jet cutting nozzle having a mechanism for providing flow rate oscillation or pressure pulsation to the jetted fluid has a structure as disclosed in a paper presented at 7th International Symposium on Jet Cutting Technology.

In the disclosed nozzle, a high frequency current is passed through an exciting coil of a magnetostriction transducer using an oscillator. The force of the magnetic field that is set up at this time is used to cause oscillation of a vibrator. The generated oscillation is transmitted to a fluid in the nozzle to cause flow rate oscillation or pressure pulsation of the fluid jetted under pressure from the nozzle.

In the well-known water jet cutting nozzle as described above, the variation in the current flowing through the exciting coil is converted into variation in the magnetic field generated by the exciting coil and the force of the magnetic field is used to cause oscillation of the vibrator, and the generated oscillation is transmitted to the fluid in the nozzle. Therefore, it is impossible to provide flow rate oscillation or pressure pulsation to the fluid jetted from the nozzle at a very high frequency on the MHz order, for instance. More specifically, even if the frequency of the high frequency current passed through the exciting coil is increased to provide variation at a very high frequency to the fluid in the water jet cutting nozzle, the vibrator cannot follow the changes in the magnetic field owing to its momentum. With the prior art method, the frequency of oscillation or pulsation can be increased only up to several tens of KHz.

Besides, two components, i.e., an exciting coil and a vibrator, are necessary for producing the variation, which complicates the nozzle construction.

OBJECT AND SUMMARY OF THE INVENTION

One object of the invention is to provide a water jet cutting nozzle which permits increase of the frequency of flow rate variation or pressure pulsation of a jetted fluid jetted up to the MHz order with a simple construction and thus enables a revolutional increase in cutting speed.

To attain the above object of the invention, there is provided a nozzle for water jet cutting, which comprises a nozzle body having an opening serving as a high pressure fluid inlet and defining an inner high pressure chamber to which a high pressure fluid can be supplied, a high pressure fluid jet orifice communicating the high pressure chamber with the outside, a piezoelectric element for providing oscillation or pulsation to the high pressure fluid in the high pressure chamber and a power source for applying a voltage varying with time to the piezoelectric element.

The piezoelectric element is oscillated at the same frequency as that of the applied voltage. That is, by applying a voltage at a frequency on the MHz order to the piezoelectric element, flow rate variation or pressure pulsation of the fluid jetted from the nozzle is caused at the MHz order, and thus the cutting speed can be greatly increased.

The above and other objects and features of the invention will become more apparent from the following detailed description with reference to the accompanying drawings.

DETAILED DESCRIPTION OF THE PREFERRED EMBODIMENTS

Figure 1:
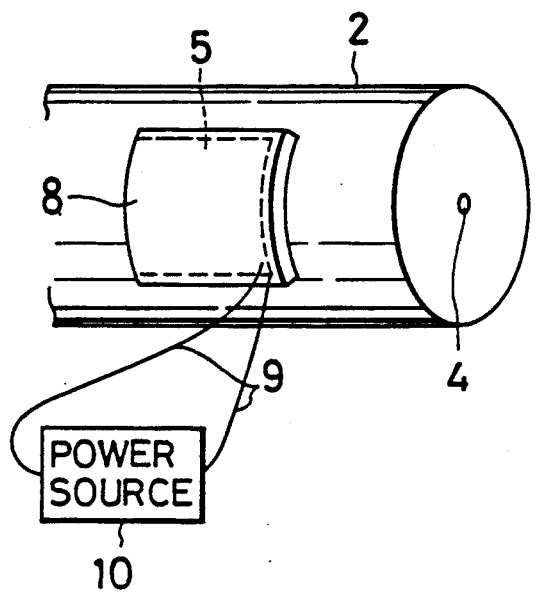
FIG. 1 is a fragmentary perspective view showing a first embodiment of the water jet cutting nozzle according to the invention.
Figure 2:
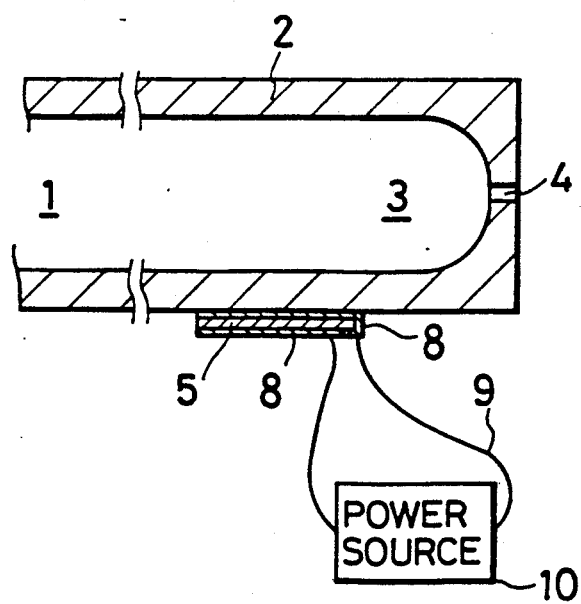
FIG. 2 is a sectional view showing the nozzle of FIG. 1.

FIGS. 1 and 2 show a first embodiment of the nozzle for water jet cutting. Reference numeral 2 designates a nozzle body having a rear end opening 1 to be connected to a high pressure fluid supply source (not shown) and a jet orifice 4 provided at the front end for jetting a fluid. The body 2 defines a pressure chamber 3 in its inside. A piezoelectric element 5 is provided on the outer periphery of the nozzle body 2 defining the pressure chamber 3. The piezoelectric element 5 has two electrode plates from which leads 9 are led for connection to a power source 10.

In the nozzle having the above construction, a high pressure fluid is supplied continuously to the nozzle from the opening 1, while a voltage changing with time in a predetermined manner is applied from the power source 10 to the piezoelectric element 5. As a result, the piezoelectric element 5 is oscillated in synchronism with the waveform of the applied voltage. The oscillation of the piezoelectric element 5 is transmitted to the body 2 of the water jet cutting nozzle, and the resultant oscillation of the body 2 is transmitted to the interior fluid under high pressure.

Figure 3:
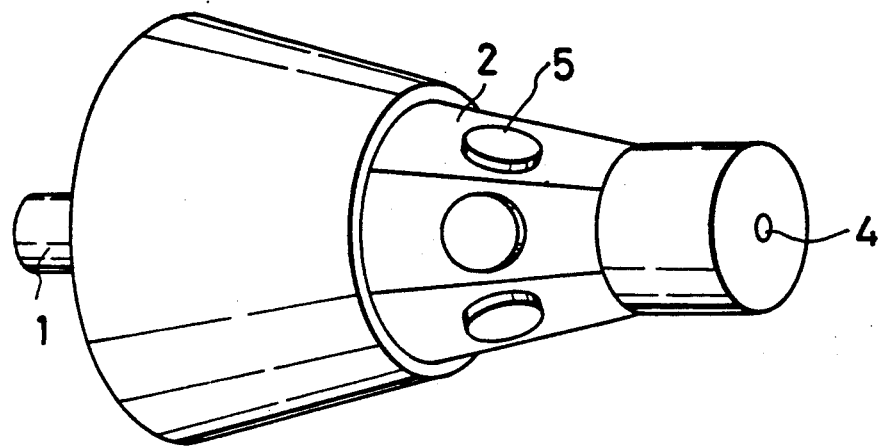
FIG. 3 is a perspective view showing a second embodiment of the nozzle according to the invention.

While the piezoelectric element 5 is provided on the wall of the nozzle body 2 defining the pressure chamber 3 in this embodiment, it may bonded to any desired place of the nozzle. Its shape is not limited to the rectangular shape as shown, for instance it may be circular instead. The greater its area, the greater effect of transmitting oscillation to the fluid under pressure that can be obtained. A similar increase in effect can be obtained by increasing the number of the piezoelectric element 5. FIG. 3 shows a second embodiment of the nozzle. In this instance, a plurality of piezoelectric element 5 are provided on the outer periphery of a portion of the nozzle body 2 near its front end. In this case, oscillation can be effectively transmitted to a fluid to be jetted.

The voltage applied to the piezoelectric element(s) 5 may be of any waveform so long as it varies with time; for example it may have a sinusoidal, sawtoothed or any other waveform. This means that as the power source 10 may be a high frequency AC power source, a pulse power source, etc., selected depending on the purpose. Where a voltage at a frequency of the MHz order is applied, the piezoelectric element 5 undergoes oscillation at a frequency of the MHz order and transmits the oscillation to the fluid. The amplitude of oscillation of the piezoelectric element is proportional to the magnitude of the applied voltage.

Fluid under high pressure is supplied into the pressure chamber 3 of the water jet cutting nozzle through the opening 1 to be jetted through the orifice 4. When an AC voltage at a very high frequency is applied to the piezoelectric element 5 in this state, the rate of flow or pressure of the fluid being jetted through the orifice 4 can be varied or pulsated at a very high frequency.

Figure 4:
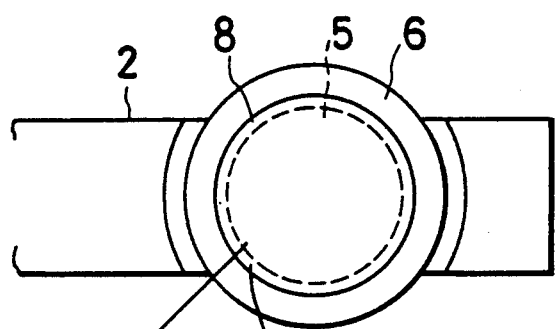
FIG. 4 is a plan view showing a third embodiment of the nozzle according to the invention.
Figure 5:
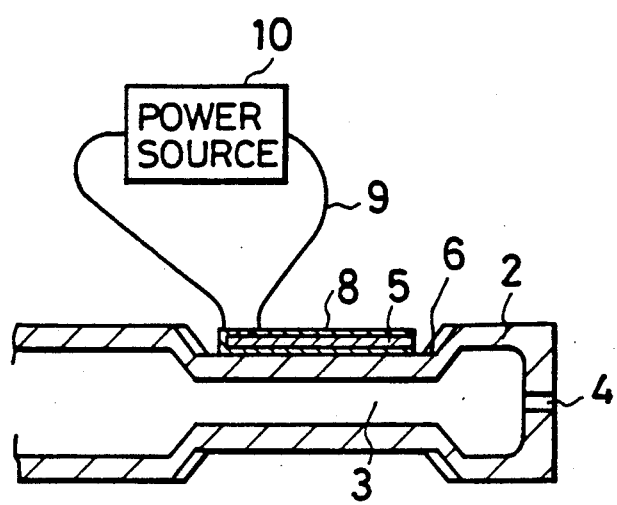
FIG. 5 is a sectional view showing the nozzle of FIG. 4.

FIGS. 4 and 5 show a third embodiment of the water jet cutting nozzle according to the invention. In this instance, the nozzle body 2 has a circular flattened portion 6 on which the piezoelectric element 5 is provided. Leads 9 are led out from two electrode plates 8 of the piezoelectric element 5 for connection to a power source 10. The flattened portion 6 may be provided at any position of the body 2 of the water jet cutting nozzle. An enhanced effect can be obtained by providing a piezoelectric element on the back side of the flattened portion as well.

With the instant arrangement in which the nozzle is provided with the flattened portion 6 and the piezoelectric element 5 is provided thereon, it is possible to increase the area of contact between the nozzle body 2 and the piezoelectric element 5. Greater oscillation thus can be transmitted to the high pressure fluid in the pressure chamber 3.

Figure 6:
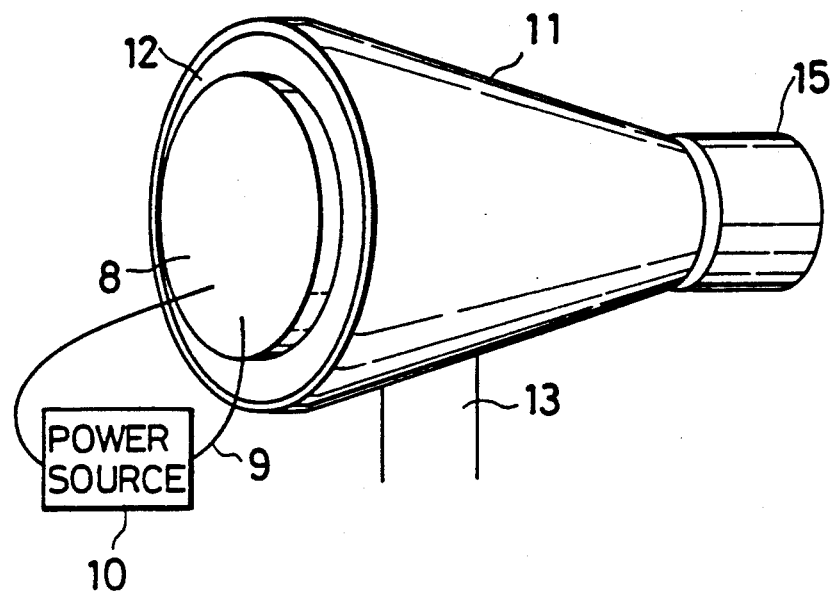
FIG. 6 is a perspective view showing a fourth embodiment of the nozzle according to the invention.
Figure 7:
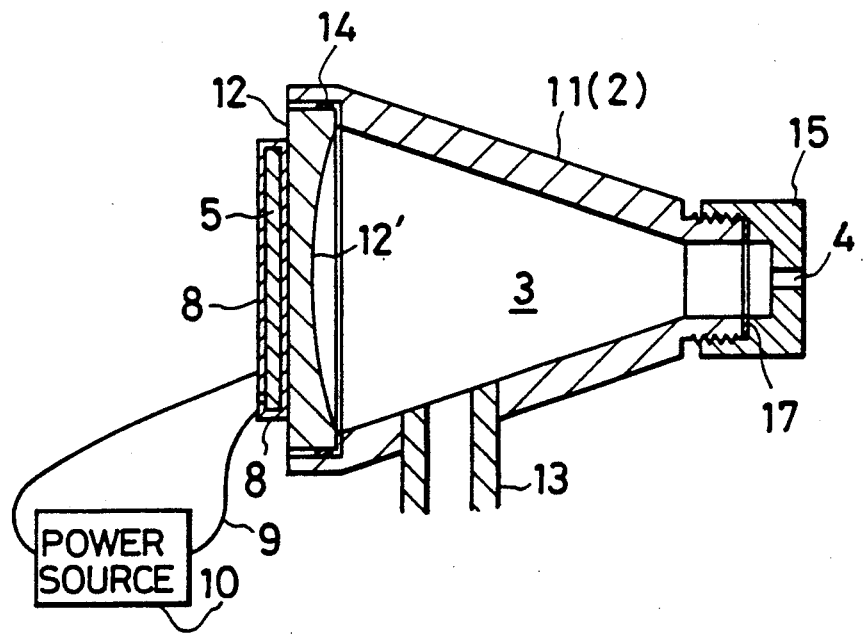
FIG. 7 is a sectional view showing the nozzle of FIG. 6.

FIGS. 6 and 7 show a fourth embodiment of the water jet cutting nozzle according to the invention. This embodiment has a conical nozzle body 11. An end member 15 having a jet nozzle 4 is screwed on an apex portion of the body 11 via a packing 17. The rear end opening of the body 11 is closed via a packing 14 by a rear end member 12 having a concave inner surface 12' which is in contact with a fluid under high pressure. A piezoelectric element 5 is provided on the outer surface of the end member 12. To the peripheral wall of the nozzle body 11 is connected a socket 13 with an opening connected to a high pressure fluid source.

Since in this embodiment of the nozzle the end member 12 has the concave inner surface 12' in contact with the high pressure fluid, the oscillation of the piezoelectric element 5 can be effectively transmitted to the high pressure fluid in the pressure chamber 3. In addition, since the pressure chamber 3 becomes narrower toward the jet orifice 4, an effect of increasing the propagated oscillation can be obtained.

Figure 8:
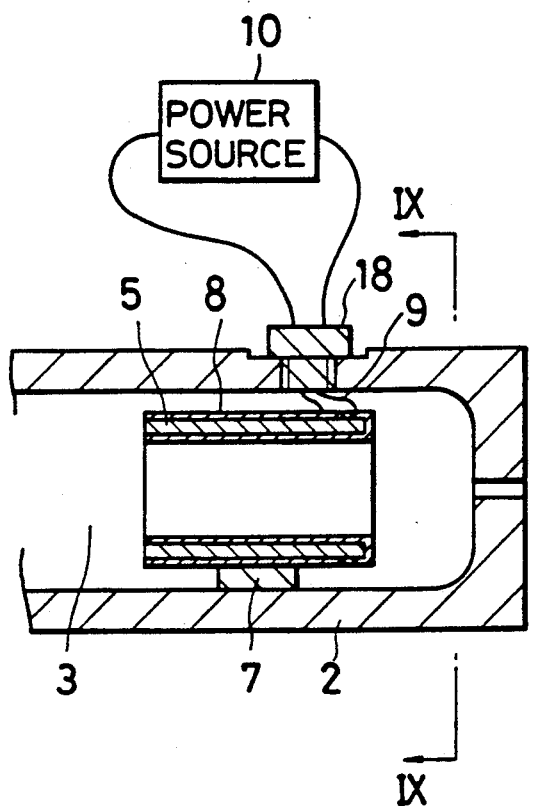
FIG. 8 is a fragmentary sectional view showing a fifth embodiment of the nozzle according to the invention.
Figure 9:
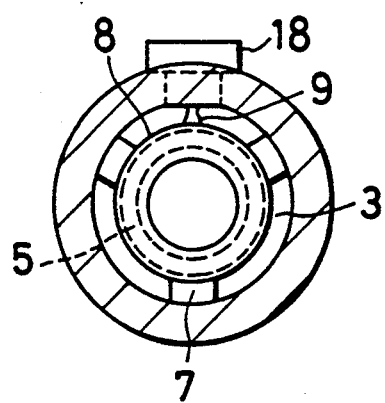
FIG. 9 is a sectional view taken along line IX-IX in FIG. 8.

FIGS. 8 and 9 shows a fifth embodiment of the water jet cutting nozzle according to the invention. In this instance, a cylindrical piezoelectric element 5 is suspended by a support member 7 in a high pressure fluid chamber (or fluid path) in the nozzle body 2. Leads 9 from two electrode plates 8 of the piezoelectric element 5 are led out through a high pressure bushing 18 which has leads to the outside of the body 2 of the water jet cutting nozzle that connect to a power source 10.

The two electrode plates 8 of the piezoelectric element 5 and leads 9 are covered by an insulating material such as epoxy resin.

With the arrangement of this embodiment in which the piezoelectric element 5 is provided in the high pressure fluid path, the oscillation of the piezoelectric element 5 is transmitted to the high pressure fluid directly and without attenuation. Thus, it is possible to transmit oscillation at a frequency of the MHz order accurately to a high pressure fluid to be jetted.

The shape of the piezoelectric element in the pressure chamber 3 is not limited to the cylindrical shape as illustrated. For example, it is possible to use a rectangular piezoelectric element or to provide two piezoelectric elements on opposed pressure chamber surfaces defining the fluid path.

As has been described in the foregoing, the nozzle for water jet cutting according to the invention utilizes a piezoelectric element for providing oscillation to a fluid to be jetted. Thus, it is possible to increase the frequency of flow rate oscillation or pressure pulsation of the fluid jetted through the orifice up to a very high frequency of the order of several MHz, thus permitting a revolutional increase in the cutting speed.

Further, with the water jet cutting nozzle according to the invention oscillation or pulsation of a desired waveform can be provided to the fluid in the nozzle. This means that the cutting speed can be increased by providing oscillation or pulsation having a sharply rising waveform. It is further possible to provide oscillation or pulsation having a pulse waveform.

What is claimed is:

1. A nozzle for water jet cutting, comprising:
   a nozzle body defining a high pressure chamber therein, said nozzle body having one end connected to a high pressure fluid supply source, said nozzle body having another end including an orifice communicating said high pressure chamber with an outside area to jet a high pressure fluid from said high pressure chamber to the outside area;
   at least one piezoelectric element mounted on said nozzle body so as to transmit oscillation to said high pressure fluid, said at least one piezoelectric element oscillating at a frequency in synchronism with a voltage applied thereto by a power source, said frequency being in the order of several MHz and the amplitude of oscillation of the piezoelectric element being proportional to the magnitude of the applied voltage, wherein said piezoelectric element is provided on the outer surface of said nozzle body.

2. A nozzle for water jet cutting, comprising:
   a nozzle body defining a high pressure chamber therein, said nozzle body having one end connected to a high pressure fluid supply source communicating with said high pressure chamber, said nozzle body having another end including an orifice communicating said high pressure chamber with an outside area to jet a high pressure fluid from said high pressure chamber to the outside area;

at least one flattened portion formed on an outer wall surface of said nozzle body;

at least one piezoelectric element fixed on said at least one flattened portion for providing oscillations or pulsation to the high pressure fluid within said high pressure chamber; and a power source for applying a voltage varying with time to said piezoelectric element, wherein said nozzle body has an inner concave wall surface at a position corresponding to said outer wall surface of said nozzle body on which said at least one flattened portion provided with said piezoelectric element is formed.

3. A nozzle for water jet cutting, comprising:
a nozzle body defining a high pressure chamber therein, said nozzle body having one end connected to a high pressure fluid supply source communicating with said high pressure chamber, said nozzle body having another end including an orifice communicating said high pressure chamber with an outside area to jet a high pressure fluid from said high pressure chamber to the outside area;

at least one flattened portion formed on an outer wall surface of said nozzle body;

at least one piezoelectric element fixed on said at least one flattened portion for providing oscillations or pulsation to the high pressure fluid within said high pressure chamber; and a power source for applying a voltage varying with time to said piezoelectric element, wherein said at least one flattened portion comprises a plurality of flattened portions arranged with an axis of said high pressure chamber as a center and said at least one piezoelectric element comprises a plurality of piezoelectric elements fixed one each on said plurality of flattened portions.

* * * * *